United States Patent [19]
Finnemore

[11] Patent Number: 6,155,209
[45] Date of Patent: Dec. 5, 2000

[54] AIR PREHEATER SECTOR PLATE DESIGN WITH CENTERED SEALING ARRANGEMENTS

[75] Inventor: Harlan E. Finnemore, Pocatello, Id.

[73] Assignee: ABB Air Preheater, Inc., Wellsville, N.Y.

[21] Appl. No.: 09/448,363

[22] Filed: Nov. 23, 1999

[51] Int. Cl.[7] .................................................. F23L 15/02
[52] U.S. Cl. .................................... 122/1 A; 122/DIG. 2; 165/8; 165/9; 165/10
[58] Field of Search .......................... 122/1 A, DIG. 2; 165/8, 9, 10

[56] References Cited

U.S. PATENT DOCUMENTS

| | | | |
|---|---|---|---|
| 3,891,030 | 6/1975 | Schluter et al. | 165/10 |
| 4,673,026 | 6/1987 | Hagar et al. | 165/9 |
| 5,615,732 | 4/1997 | Brophy et al. | 165/8 |
| 5,836,378 | 11/1998 | Brophy et al. | 165/9 |

*Primary Examiner*—Denise L. Ferensic
*Assistant Examiner*—Gregory A. Wilson
*Attorney, Agent, or Firm*—Alix, Yale & Ristas, LLP

[57] ABSTRACT

A sector plate static sealing arrangement for a rotary regenerative air preheater employs a single rib attached to and extending along the center line of the sector plate toward the air preheater casing. The rib cooperates with a static seal attached to the casing to provide both the sealing and positioning functions. Braces for the rib provide support and form a sloped surface which reduces ash accumulation.

5 Claims, 5 Drawing Sheets

AIR PREHEATER SECTOR PLATE DESIGN WITH CENTERED SEALING ARRANGEMENTS

BACKGROUND OF THE INVENTION

The present invention relates to rotary regenerative air preheaters having sector plates dividing the air preheater into a gas sector and one or more air sectors and having radial seals and static seals which cooperate with the sector plates to reduce the leakage between the air preheater sectors. More particularly, the invention relates to a novel arrangement of the static seals and sector plates for improved performance.

A rotary regenerative air preheater transfers sensible heat from the flue gas leaving a boiler to the entering combustion air through regenerative heat transfer surface in a rotor which turns continuously through the gas and air streams. The rotor, which is packed with the heat transfer surface, is divided into compartments by a number of radially extending plates referred to as diaphragms. These compartments are adapted to hold modular baskets in which the heat transfer surface is contained.

The air preheater is divided into a flue gas side or sector and one or more combustion air sides or sectors by pie-shaped, radially disposed sector plates. Flexible radial seals on the rotor, usually mounted on the top and bottom edges of the diaphragms, engage or are in close proximity to these sector plates and minimize leakage of gas and air between sectors through the space between the rotor and the sector plates. Likewise, static seals mounted to the air preheater casing cooperate with the sector plates to minimize the leakage through the space between the sector plates and the casing.

The existing arrangements of static seals and sector plates incorporate static seals on one or both of the side edges of the sector plates. The sector plates can move with respect to the static seals during operation but still maintain sealing engagement. In addition, the sector plates are pinned against arcuate and radial displacement. Pinning arrangements are employed near the central hub of the air preheater and at a center point near the outer ends of the sector plates to keep the sector plates on center and to resist the lateral pressure loading on the sector plates caused by the differential in pressure between the higher pressure air and the lower pressure gas.

Because the orientation of static seals is presently along the air and/or gas edges of the sector plates, additional loading may be imposed to both the pinning arrangement and static seals due to thermal growth differentials. In addition, the sector plates on the top of the air preheater often accumulate excessive ash which may be trapped between the sector plates and the external casing of the air preheater causing interference with relative movement. This can be a significant problem which can actually result in the deformation of the sector plate and can result in higher axial loads being transmitted to supports. Other problems can occur with present designs where static seals are employed along both radial sides of the sector plates. One problem is the interference between the sector plate and the two opposing static seals due to differential thermal growth as between the static seals and the pinning arrangement. Another problem is the potential thermal distortion of the sealing face of the sector plate due to a differential temperature between the sealing face of the sector plate and the opposite shielded face of the sector plate adjacent the casing.

SUMMARY OF THE INVENTION

The invention involves a simplified sector plate static sealing arrangement which combines the sealing and sector plate pinning or locating functions, which provides structural support of the sector plate and which reduces the possibility of ash accumulation between the sector plates and the air preheater external casing. The arrangement further reduces the area of the sector plate subjected to pressure differentials. In particular, the arrangement employs a single sector plate rib extending along the center line of the sector plate which cooperates with a static seal on the casing to provide both the sealing and the pinning functions. Braces for the center rib provide support and form an essentially triangular cross-sectional configuration which reduces ash accumulation.

DESCRIPTION OF THE PREFERRED EMBODIMENTS

Figure 1:
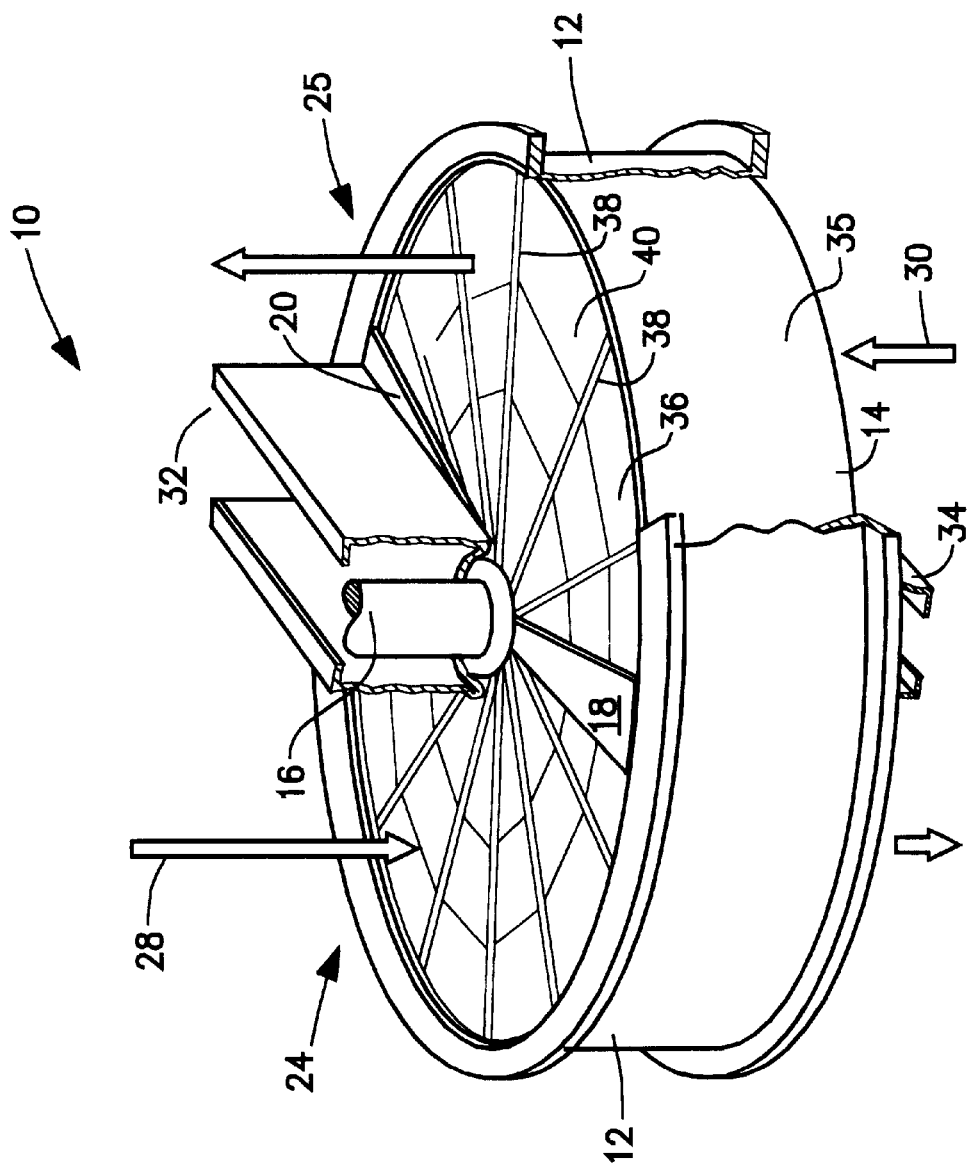
FIG. 1 is a general perspective view of a conventional rotary regenerative air preheater.

FIG. 1 of the drawings is a partially cut-away perspective view of a typical bi-sector air preheater 10 showing a housing 12 in which the rotor 14 is mounted on a drive shaft or post 16. The housing is divided by means of the flow impervious sector plates 18 and 20 into a flue gas sector 24 and an air sector 25. Corresponding sector plates are also located on the bottom of the unit. The hot flue gases enter the air preheater 10 as indicated by the arrow 28, flow through the flue gas sector 24 where heat is transferred to the heat transfer surface in the rotor 14. As this hot heat transfer surface then rotates through the air sector 25, the heat is transferred to the air flowing through the rotor from the bottom as indicated by the arrow 30. Consequently, the cold air inlet and the cooled gas outlet define a cold bottom end and the hot gas inlet and the heated air outlet define a hot top end. Located on the top end of the housing is the hot end center section 32 with a corresponding cold end center section 34 on the bottom end. The rotor 14 has a shell 35 and is divided into a plurality of pie-shaped compartments 36 by the diaphragm plates 38 with each compartment containing a plurality of heat exchange basket modules 40.

Figure 2:
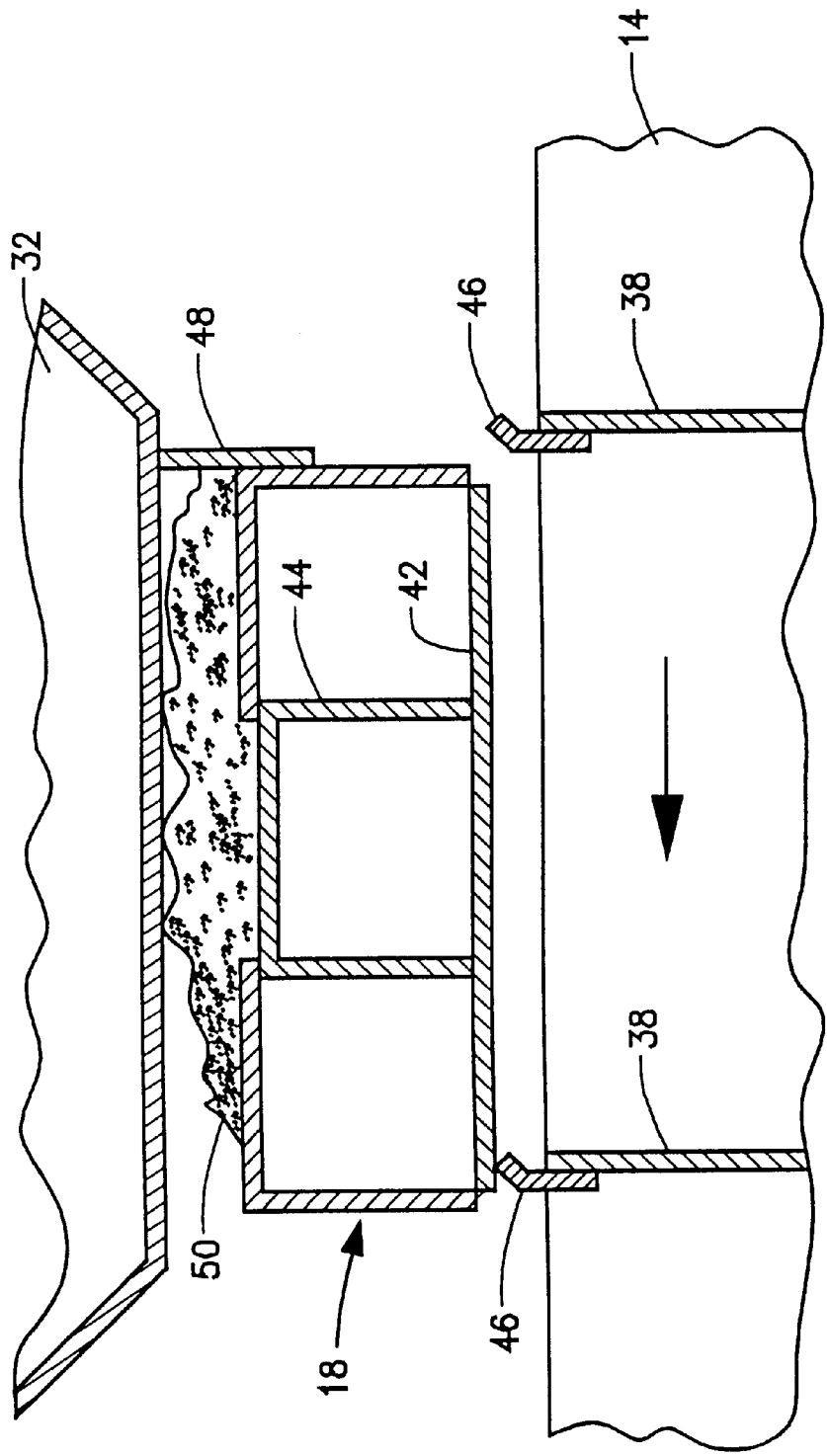
FIG. 2 is a cross section of a portion of a conventional air preheater viewed radially and showing portions of the rotor, the hot end center section and the sector plate.

FIG. 2 illustrates a prior art static sealing arrangement in which the sector plate structure generally designated 18 comprises the plate 42 and a supporting box structure 44. This drawing shows a portion of the rotor 14 with the diaphragm plates 38 and the radial seals 46. A static seal 48 is attached to the hot end center section 32 and extends radially along the side edges of the sector plate structure 18. Ash accumulation on top of the sector plate structure 18 is shown at 50 between the sector plate structure and the hot end center section 32 of the air preheater casing. Although only one static seal is illustrated along one radial side edge of the sector plate structure, static seals are also used in the prior art along both side edges. Although that reduces ash accumulation, it creates other problems as discussed above.

Figure 3:
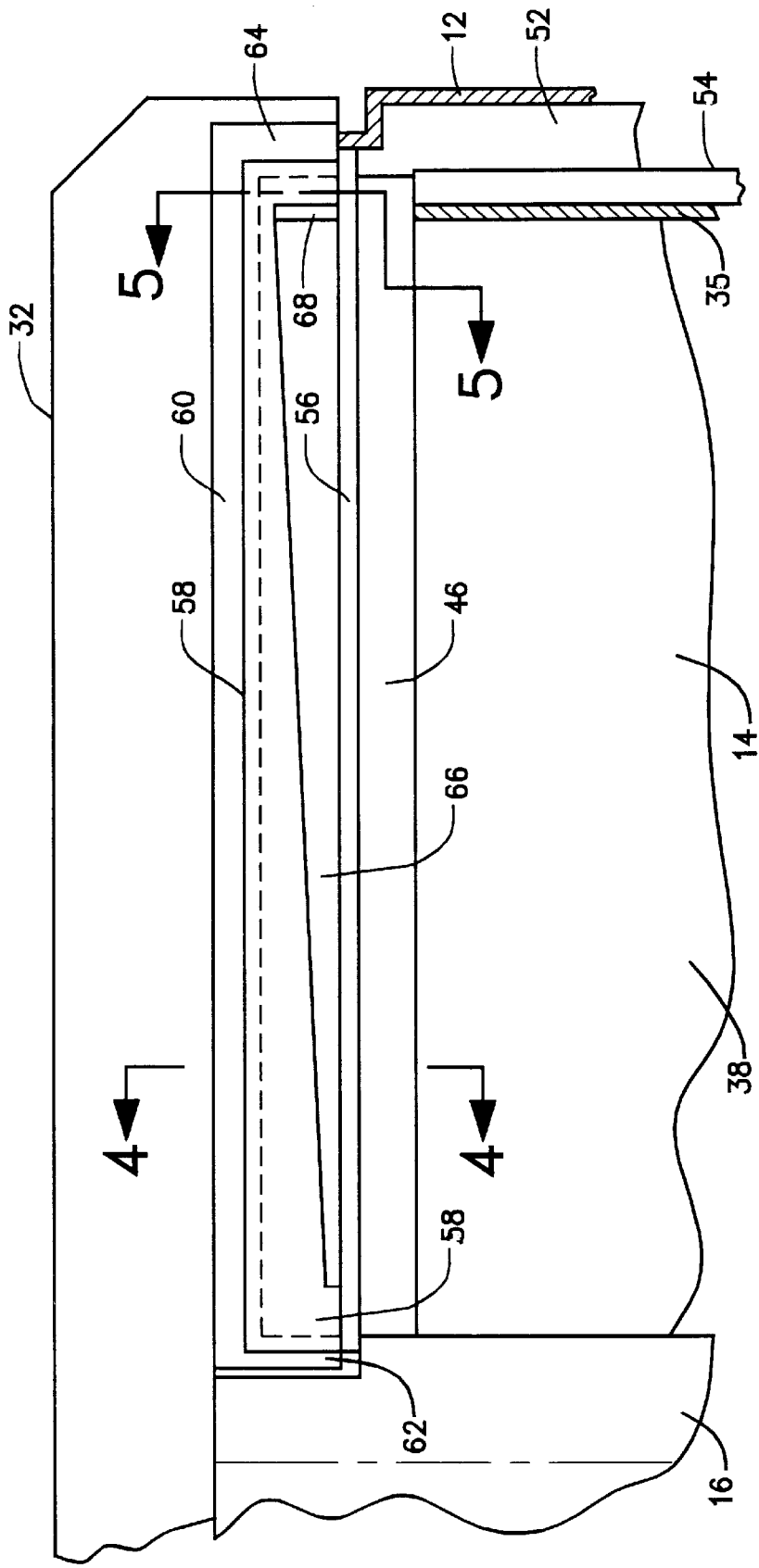
FIG. 3 is a side view in cross section of a portion of an air preheater according to the invention showing the sector plate with the center rib and the static seal.
Figure 4:
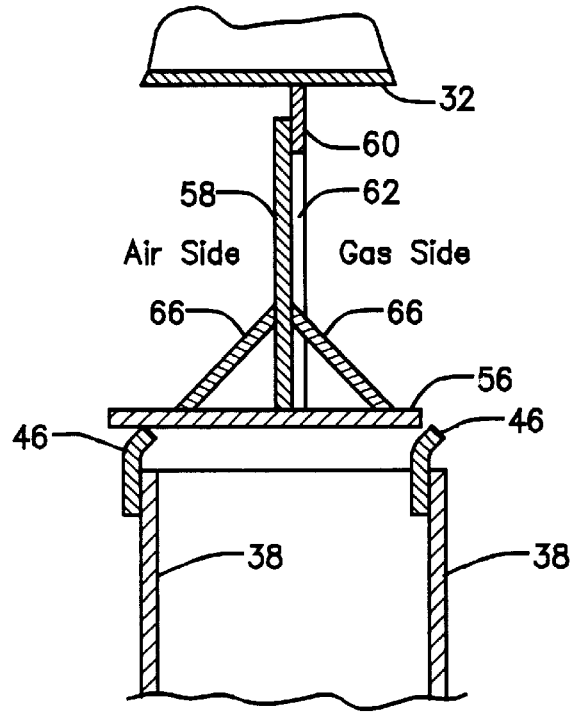
FIG. 4 is a section view taken along the line 4—4 of FIG. 3.
Figure 5:
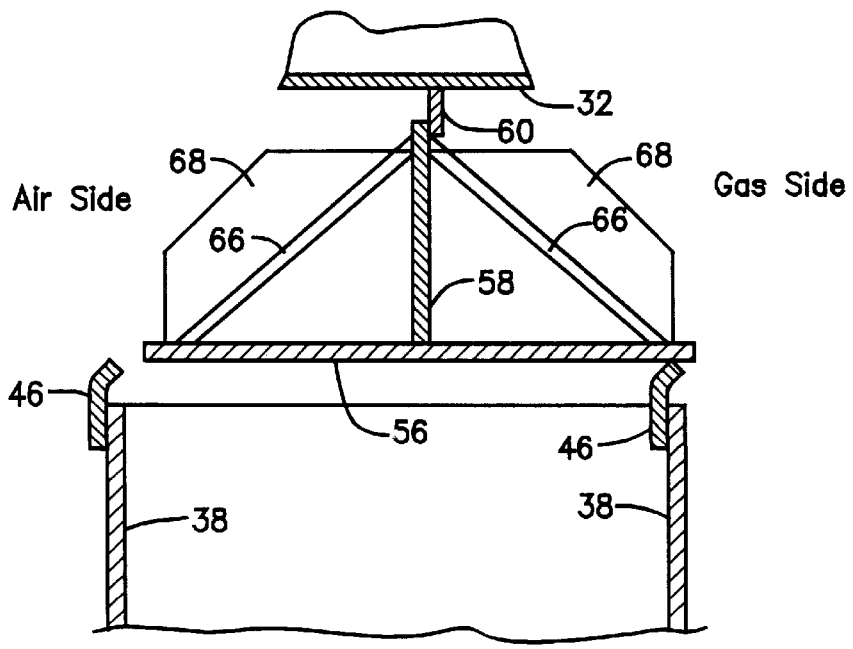
FIG. 5 is a section view taken along line 5—5 of FIG. 3.

Turning now to the present invention and referring to FIGS. 3, 4 and 5 illustrating one embodiment, a portion of a rotor 14 is shown mounted around the post 16 and including a rotor shell 35, diaphragm plates 38 and radial seals 46. Also shown is the hot end center section 32, an air preheater housing 12, an axial seal plate 52 and an axial seal 54. Adjacent to the upper end of the rotor 14 and engaging the radial seals 46 is the sector plate 56. As seen most clearly in FIGS. 4 and 5, a center rib 58 extends radially along the center line of the sector plate 56. As seen in FIG. 3, this center rib 58 extends substantially the entire length of the sector plate 56. Attached to the hot end center section 32 is the static seal 60 which extends down below the top of the center rib 58 to overlap the center rib and engage the side of the center rib. As seen in FIG. 3, the static seal 60 also extends down at 62 and 64 to overlap the inner and outer ends respectively of the center rib 58. The overlap of the static seal on the center rib, as clearly seen in FIGS. 4 and 5, is also shown by the dotted line in this FIG. 3.

Attached on each side of the center rib 58 at an angle between the center rib and the sector plate 56 are the support plates 66 which are generally triangular is shape as seen in FIG. 3 to follow the shape of the sector plates. These plates 66 not only help to support the center rib 58 on the sector plates but also provide a sloped surface above the sector plate 56. In other words, the sector plate structure including these plates 66 has a triangular configuration in cross section. This configuration greatly reduces or eliminates the possibility of ash accumulation between the sector plate and the external casing. The triangular configuration also permits physical access to the static sealing area. Mounted adjacent to the outer ends of the sector plates 56 are the plates 68 on each side of the center rib 58 which provide rigidity to the sector plate. Although the invention is being described with respect to the upper, hot end of the air preheater, the invention is also applicable to the cold end sector plates and static seals.

A significant feature and advantage of having the static sealing located along the sector plate center line is that there is a reduction of the area of the sector plate which is subjected to the pressure differential between the higher pressure air side and the lower pressure gas side. In the prior art as shown in FIG. 1, at the instant before a radial seal 46 passes from the gas side onto the face of the sector plate, the pressure above the entire sector plate structure is the high air pressure while the pressure below the entire sector plate is the low gas pressure. The entire sealing surface is exposed to the air/gas pressure differential with the resulting loads on the supporting points and sector plate structure. With the invention as shown in FIG. 4 with the radial seals in the same position, the pressure above only part of the sector plate (left hand side) is the high air pressure while the pressure on the top of the other part (right hand side) as well as below the plate is the low gas pressure. When the rotor has moved to the position shown in FIG. 5, the pressure below the plate changes to the higher gas pressure. As a result of this design, only half the sector plate is subjected to the differential pressure thereby reducing structural loads.

Another advantage of the sealing arrangement of the invention is that it is easier to move or relocate the sector plate in an arcuate direction. As operating conditions of the boiler change over a period of years, it may be desirable to change the division of air between air preheater sectors such as to increase the size of the primary air sector of a tri-sector air preheater to allow for more air flow to the pulverizing mills. Because the static seals in the conventional arrangement are supported from the hot and cold end center sections of the casing along the edges of the sector plates, moving the sector plates very far in an arcuate direction would require extensive changes to the casing in order to be able to move the support for the static seals. With the invention where the sealing is accomplished along the center of the sector plates, there is more latitude for moving the mounting of the static seals on the casing to arcuately move the static seals and sector plates without any casing modifications.

A further advantage is that the conventional pinning arrangements are eliminated since the center rib 58 and static seal 60 of the invention now serve to locate and fix the sector plate in position. This avoids interference between the sector plates and the static seals located along the sides of a sector plate as in the prior art when the sector plates are prevented from expanding freely due to the pinning arrangements. With the invention, differential thermal growth is not restricted from the center of the rotor to the periphery so no thermal loads are induced. Unrestricted thermal expansion in the radial direction is permitted.

Figure 6:
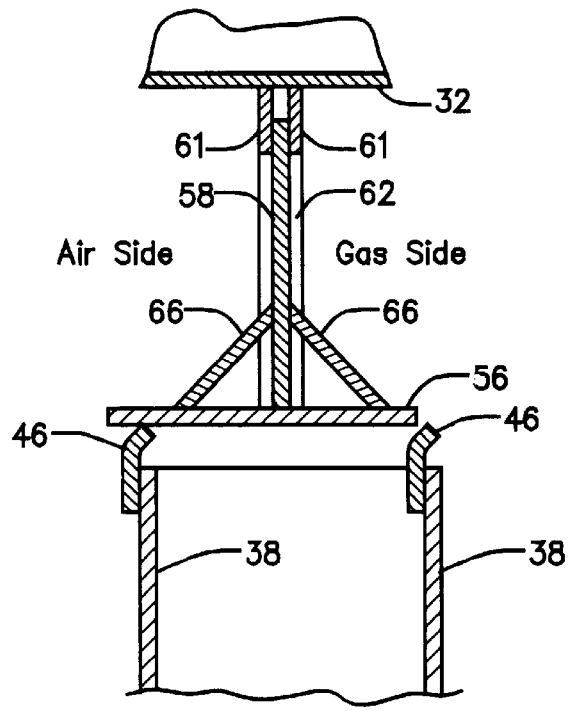
FIG. 6 is a section view similar to FIG. 4 showing an alternative static seal.
Figure 7:
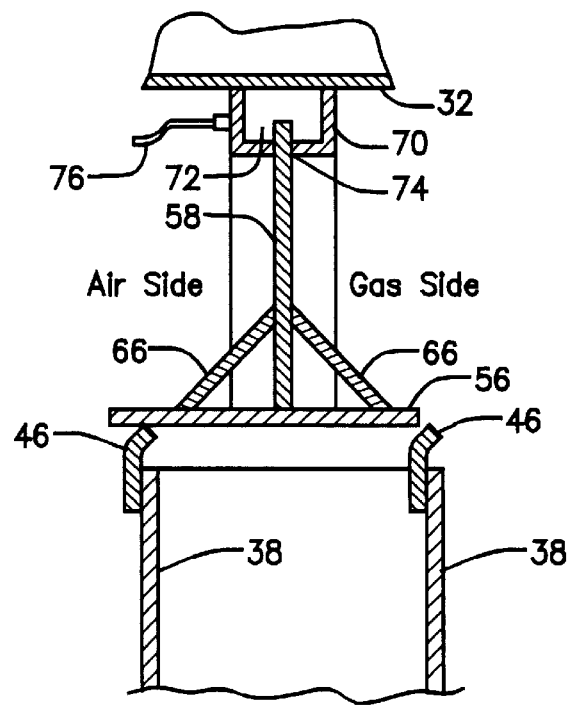
FIG. 7 shows a further alternate static seal.

An alternate arrangement for the static seal is show in FIG. 6 in which the static seal now comprises two separate static seal strips 61, one on each side of the center rib 58. This arrangement provides more of a labyrinth and a better seal. A further alternate arrangement for the static seal is shown in FIG. 7 in which the static seal engaging the center rib 58 is essentially a box structure 70 forming a plenum 72 with the center rib 58 extending into the box through a slot 74. The significant volume inside of the plenum 72 (as compared to the FIG. 6 arrangement) creates what is referred to as a plenum effect. The pressure in the plenum is about half way between the high pressure on the air side and the low pressure on the gas side. The plenum effect results in a reduced leakage from the air side to the gas side as compared to the leakage which would occur with the seal arrangement of FIG. 6. Another advantage of this plenum seal arrangement is that higher pressure clean air can be injected into the plenum at 76 to reduce erosion which can be associated with dirty ash laden air flowing through the seals.

I claim:

1. An improvement in a rotary regenerative air preheater having a cold axial end casing with an air inlet and a flue gas outlet and a hot axial end casing with a heated air outlet and a flue gas inlet and having hot end sector plates adjacent said hot axial end casing dividing said air preheater into a flue gas sector and at least one air sector and further having a rotor with hot end radially extending seals cooperating with said hot end sector plates to form seals between said sectors and wherein said hot end sector plates have inboard ends adjacent the center of said rotor and outboard ends adjacent the periphery of said rotor, said improvement comprising a rib attached to each of said hot end sector plates projecting toward said hot axial end casing from said sector plate and extending down the center of said sector plate from said inboard end to said outboard end and a static seal attached to said hot end axial end casing adjacent each one of said ribs and extending from said inboard end to said outboard end and sealingly engaging said rib thereby forming a seal between said sectors.

2. An improvement as recited in claim 1 and further including support plates attached at an angle between said sector plates and said ribs.

3. An improvement as recited in claim 2 wherein said support plates are generally triangular and with the apex of the triangle adjacent the inboard end of said sector plates and the base of the triangle adjacent the outboard end of said sector plates.

4. An improvement as recited in claim 1 wherein static seals are attached to said hot end axial end casing on each side of each one of said ribs.

5. An improvement in a rotary regenerative air preheater having a cold axial end casing with an air inlet and a flue gas outlet and a hot axial end casing with a heated air outlet and a flue gas inlet and having hot end sector plates adjacent said hot axial end casing and cold end sector plates adjacent said cold axial end casing dividing said air preheater into a flue gas sector and at least one air sector and further having a rotor with hot end and cold end radially extending seals cooperating respectively with said hot end sector plates and said cold end sector plates to form seals between said sectors and wherein said hot and cold end sector plates have inboard ends adjacent the center of said rotor and outboard ends adjacent the periphery of said rotor, said improvement comprising a rib attached to each of said hot and cold end sector plates projecting respectively toward said hot axial end and cold axial end casings from said sector plates and extending down the center of said sector plates from said inboard end to said outboard end and static seals attached respectively to said hot end axial end casing and said cold end axial end casing adjacent each one of said ribs and extending from said inboard end to said outboard end and sealingly engaging said ribs thereby forming a seal between said sectors.

* * * * *